H. A. FOOTHORAP.
RIBBON MECHANISM FOR TYPE WRITING MACHINES.
APPLICATION FILED DEC. 14, 1914.

1,286,573.

Patented Dec. 3, 1918.
9 SHEETS—SHEET 4.

Inventor,
Harry A. Foothorap.
by L. G. Julihn
Attorney

UNITED STATES PATENT OFFICE.

HARRY ARTHUR FOOTHORAP, OF HARRISBURG, PENNSYLVANIA, ASSIGNOR TO ELLIOTT-FISHER COMPANY, OF HARRISBURG, PENNSYLVANIA, A CORPORATION OF DELAWARE.

RIBBON MECHANISM FOR TYPE-WRITING MACHINES.

1,286,573.   Specification of Letters Patent.   Patented Dec. 3, 1918.

Application filed December 14, 1914.   Serial No. 877,216.

*To all whom it may concern:*

Be it known that I, HARRY ARTHUR FOOTHORAP, a citizen of the United States of America, residing at Harrisburg, in the county of Dauphin and State of Pennsylvania, have invented certain new and useful Improvements in Ribbon Mechanism for Type-Writing Machines, of which the following is a specification.

This invention relates to a novel ribbon mechanism adapted more particularly for use in connection with machines of that type characterized by a stationary platen and downwardly acting printing mechanism.

The object of the invention, speaking generally, is to provide an efficient and economical ribbon mechanism for a flat platen typewriter of the visible writing type, the active portion of the ribbon being horizontally disposed and adapted to be vibrated in a horizontal plane to present the ribbon at the printing point during the actual printing of the character and to withdraw it immediately thereafter to disclose the printed record to the operator.

A still further object of the invention is to provide simple and efficient means for determining the particular track or strike of the ribbon which will be presented to the printing point.

Still other objects of the invention will appear as the necessity for their accomplishment is developed in the succeeding description of the illustrated embodiment of the invention.

In the accompanying drawings:

Fig. 11ª is a perspective view of the ribbon cup or barrel.

The machine to which my ribbon mechanism is shown applied is what is known as the Elliott-Fisher billing machine which is of that type in which the platen is stationary and above which moves longitudinally a line space frame supporting a carriage which is movable transversely of the platen to letter space the writing accomplished by a downwardly acting printing mechanism mounted on and movable with said carriage.

Figures 10, 11, 11A, 12, 13:
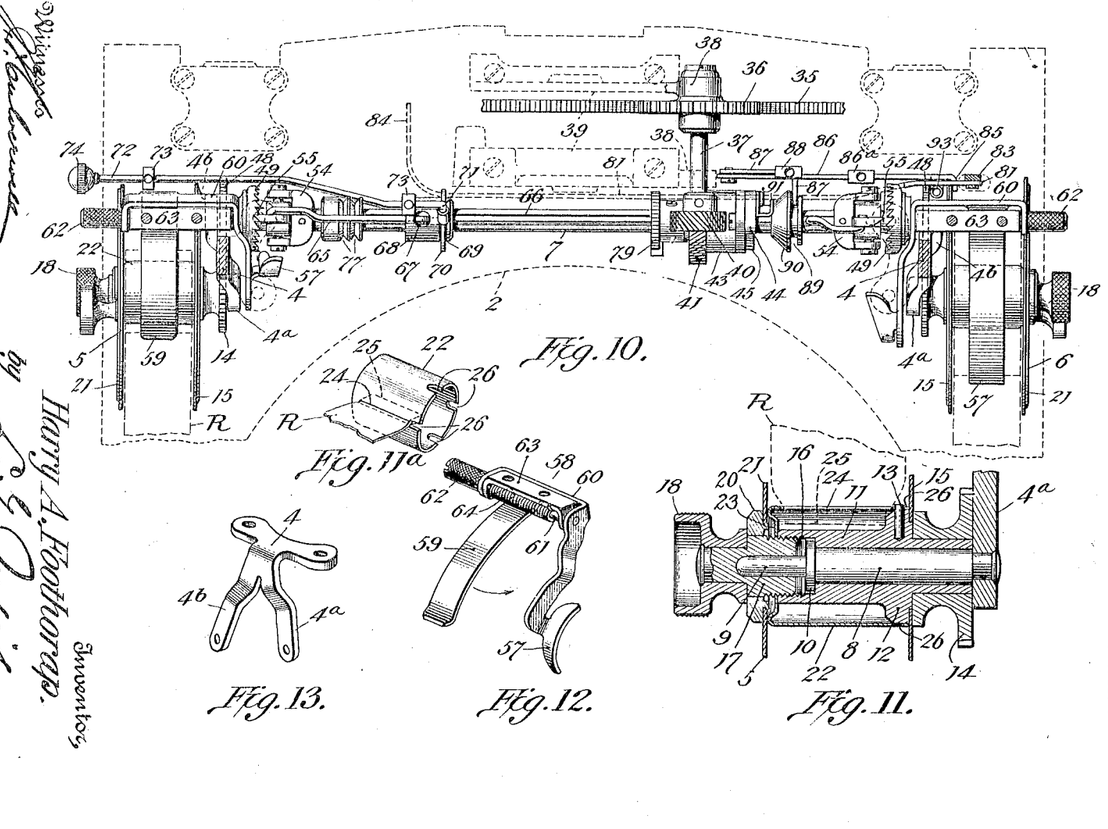
Fig. 10 is a plan view of a portion of the ribbon feeding mechanism, the adjacent structure being shown in dotted lines.
Fig. 11 is a sectional view of one of the ribbon spools and its mounting.
Fig. 12 is a detail perspective view of one of the setting devices for the ribbon reversing mechanism.
Fig. 13 is a detail view of one of the supporting brackets.

The typewriter carriage is indicated by the numeral 1 and its bottom constitutes a deck 2 below which is disposed a type ring 3 on which is mounted in a forwardly opening arc a series of type bars (not shown) which swing downwardly to a common printing point indicated by H in Fig. 1. From the deck 2 adjacent to the opposite ends thereof are suspended a pair of brackets 4 bifurcated to form bearing arms which are somewhat offset, as shown in Fig. 13. The front arms 4ª are designed for the support of the ribbon spools 5 and 6 while the rear arms 4ᵇ serve as supports for the ribbon feed shaft 7. Each of the ribbon spools is carried by a spindle 8 extended outwardly and fixed at one end only to the arm 4ª and provided with a reduced outer end 9 between which and the body of the spindle is defined an enlargement or collar 10. On the spindle proper rotates a hub section 11 formed with what may be termed the pin flange 12 from which project radially one or more clutch pins 13. The flange 12 is spaced from the bracket 4ª sufficiently to permit the interposition of a spool pinion 14 between which and the pin flange is held the inner or rear spool flange 15. The outer end of the hub section 11 is formed with an axial recess 16 which accommodates the flange 10 of the spindle and is internally threaded, as shown in Fig. 11, to receive the externally threaded inner end of the outer hub section 17 provided with a knurled head 18 and with an axial bore 19 for the reception of the reduced end of the spindle upon which it rotates. Rotatable on the outer hub section 17 adjacent to the knurled head and held in place thereby is a flange ring 20 to which is secured the outer spool flange 21. The ribbon R is secured to the spool by what is known as a ribbon cup or barrel 22 which is a thin metal shell of cylindrical form having a depressed bottom or outer end 23 formed with an opening to receive the threaded inner end of the outer hub section 17 and retained between the flanges 21 and 15. The shell cup or barrel 22 is also formed with a longitudinal slit 24 through which the ribbon R is passed and retained by a metal tab 25 located within the cup and too large to be drawn through the slit 24. As clearly shown in Fig. 11ª, the slit 24 opens at the inner end of the cup and permits the ribbon to be slipped into place without the necessity for separate securing devices. The inner edge of the cup or shell 22 is provided with one or more notches 26 which, when the shell is slipped to its place on the inner spool section, engage the pins 13 which thus compel the ribbon, shell and spool to rotate in unison. One of these notches 26 is preferably formed at the end of the slit 24 so that, when the shell is in place, one of the pins positively closes the end of the slit and precludes any sidewise working of the ribbon.

Referring to Fig. 11, let us assume that it is desired to replace the ribbon. By grasping the knurled head 18, the outer spool section may be removed or unscrewed from the inner spool section. The ribbon fastening device or shell 22 with the ribbon wound thereon is then slipped off. Another shell with a new ribbon wound thereon may then be slipped upon the inner spool section and engaged by the pins 13 where it will be held by the flange 21 when the outer spool section is screwed back into place.

Figure 1:
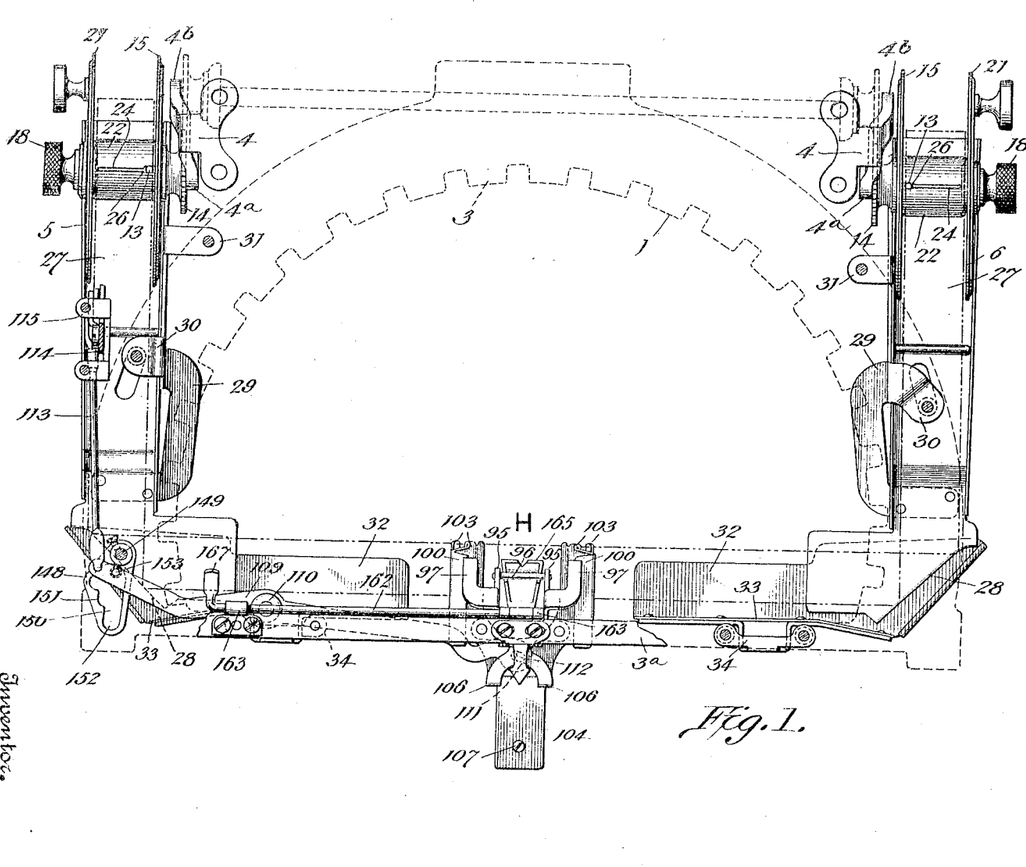
Figure 1 is a plan view of the ribbon supporting and guiding mechanism with certain of the parts shown in dotted lines and the ribbon indicated by dot and dash lines.
Figures 4, 5:
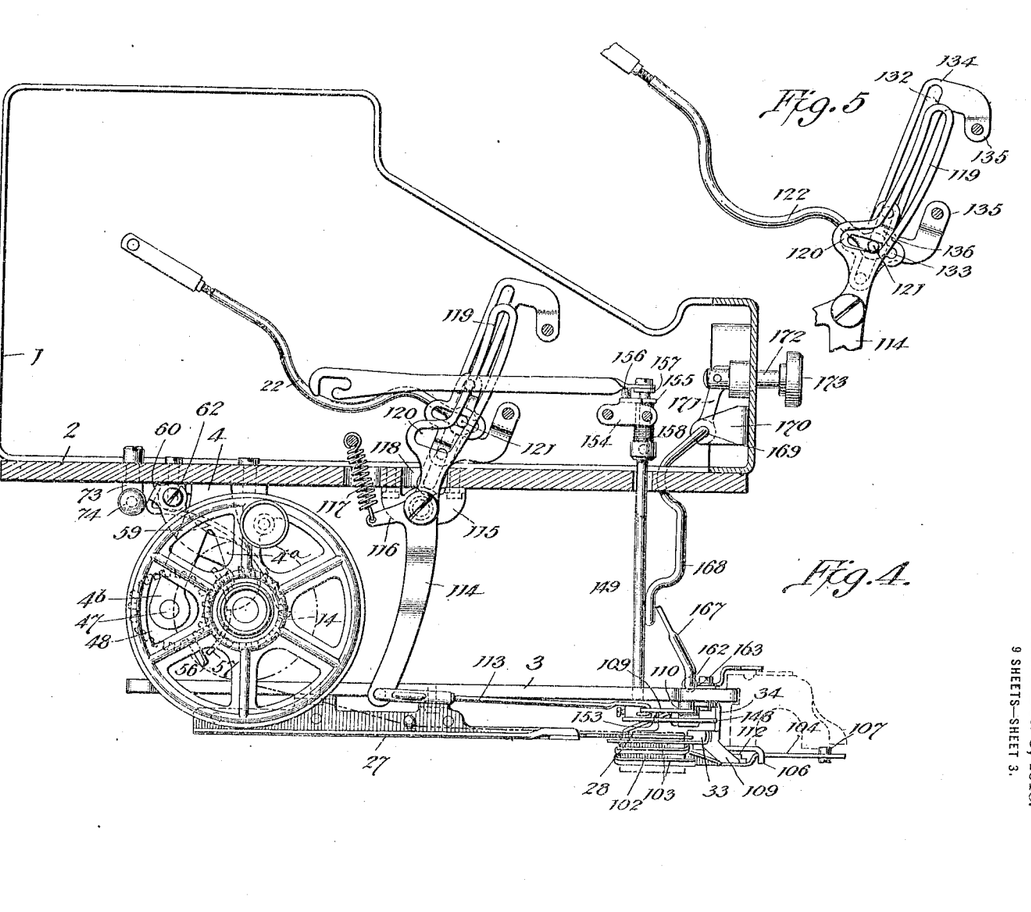
Fig. 4 is a transverse section of a portion of the machine illustrating one side or end of the mechanism shown in Fig. 2.
Fig. 5 is a detail view of a portion of the ribbon vibrating mechanism.

As will be seen by reference to Fig. 4, the ribbon spools are located somewhat nearer the rear of the carriage at the opposite sides or ends thereof but under the deck 2 and by reference to Fig. 1 it will be noted that the printing point H of the machine is adjacent to its front. It is therefore necessary to guide the ribbon R forwardly and then across the front of the machine in proximity to the printing point. For this purpose what may be termed the end guides 27 are disposed horizontally below the opposite ends of the type ring and extend from the spools to the front of the carriage where they are formed with angle guides 28 around which the ribbon is passed and caused to traverse a path across the front of the machine at right angles to the guides 27. The guides 27 are trough-shape for the major portion of their length, as shown, and are supported by end guide brackets 29 fixed to their inner sides and having front and rear tabs 30 and 31 screwed or otherwise secured to the under side of the type ring, as clearly indicated in Fig. 1. The front ends of these brackets 29 are bent into horizontal position and extended under and rigidly secured to the front end portions of the guides 27.

That portion of the ribbon extending between the angle guides 28 is protected and guided by front ribbon guides 32 in the form of plates having flanges 33 extending along their front edges and secured to brackets 34 dropped from the front bar 3ª of the type ring 3. These guides 32 underlie the angle guides 28 and terminate a sufficient distance apart to leave an interval for the ribbon vibrator and line finder to be presently described.

First, however, the ribbon feeding mechanism will be considered. Extended across the rear of the main machine frame upon which the carriage travels is the ribbon feed rack 35 with which meshes the ribbon feed pinion 36 mounted on the ribbon driving shaft 37 which is a short shaft extended at right angles to the rack 35 and journaled in bearings 38 formed in the front and rear escapement brackets 39. On the inner end of the shaft 37 is a small worm gear 40 meshing with a somewhat larger worm gear 41 mounted on the ribbon feeding shaft 7 and designed to be clutched thereto when the ribbon is to be fed and to be released therefrom to effect the release of the ribbon during the retraction of the carriage or free forward movement thereof. The wheel 41 has a hollow hub 43 on one end of which is mounted a driving pawl 44 spring urged into engaging relation with the driving ratchet 45 fixed to the shaft 7 and having its hub extended into the hollow hub 43 of the gear 41, as shown. Under normal writing conditions, the rotation of the pinion 36 by reason of its movement with the carriage while enmeshed with a fixed rack, will rotate the shaft 37 and through the worm gears 40 and 41 will rotate the hub shaft 7 through the medium of the pawl 44 and the ratchet 45. This movement of the shaft 7 is intended to be imparted to one of the ribbon spools. The shaft 7 is therefore provided with reduced ends 46 journaled in bearings 47 fixed to and extended inwardly from the arms 4$^b$ of the brackets 4 and upon the exterior of these bearings 47 are mounted driving pinions 48 meshing with the spool pinions 14 and having their hubs provided with crown ratchets 49, each of which forms one element of a clutch designated as a whole by 50.

The two clutches 50 are designed to be brought into action alternately to drive the ribbon spools in alternation. The other element of each clutch 50 is in the form of a lever 51 having an annular central portion 52 which surrounds the shaft 7 and is fulcrumed upon two opposed fulcrum screws 53 screwed into the ends of a lever supporting yoke 54 keyed or otherwise secured to the shaft 7. At one end of the lever 51 is a tooth 55 designed to engage the teeth of the ratchet 49 and the opposite end 56 of the lever is of reduced cylindrical form to engage a reversing cam 57 constituting one arm of a controlling device designated as a whole by 58 and having another arm 59 which is in effect a follower resting upon the periphery of the wound portion of the ribbon and designed to follow in toward the axis of the ribbon spool as the ribbon is unwound therefrom for the purpose of presenting the reversing cam 57 into position to be engaged by the end 56 of the adjacent lever 51. When the cam is in such position, the rotation of the shaft 7 will move the lever 51 along the cam which will swing the lever into engagement with the adjacent crown ratchet and thus clutch the adjacent driving gear to the shaft 7 to establish a driving connection between the depleted spool and the ribbon feeding mechanism.

Figures 7, 8, 9:
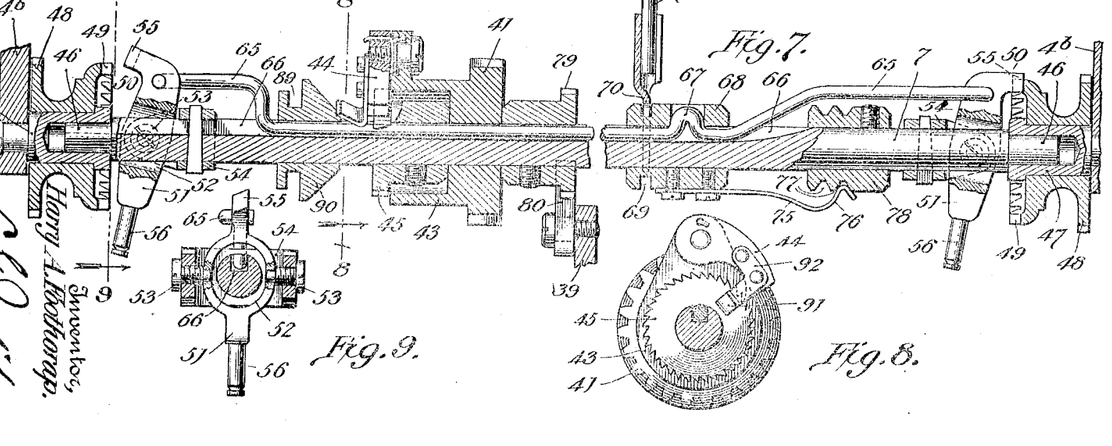
Fig. 7 is a longitudinal section through the subject-matter of Fig. 6 but on a somewhat larger scale and with the center broken out.
Fig. 8 is a transverse section on the line 8—8 of Fig. 7.
Fig. 9 is a detail section on the line 9—9 of Fig. 7.

The controlling device 58, consisting of the cam arm 57, follower arm 59 and connecting piece 60, is mounted to swing from a pin 61 having a knurled head 62 and mounted to rotate in a bearing bracket 63 secured to the bottom of the carriage deck 2, a spring 64 serving to swing the controlling device toward its active position as the resistance opposed to such movement by the ribbon wound on the adjacent spool is gradually withdrawn. The two clutch levers 51 are connected by a reversing bar 65 mounted to move in a longitudinal channel 66 in the shaft 7 and bent to form a lateral projection 67 engaging a cylindrical shifter 68 mounted on the shaft 7 to rotate therewith but shiftable longitudinally thereof to move the reversing bar endwise in one direction or the other for the purpose of engaging one lever 51 and disengaging the other. The shifter 68 is formed with an annular groove 69 to receive a yoke 70 carried by the downturned end 71 of a reversing rod 72 slidable in bearings 73 suspended from the deck 2. The outward end of the reversing rod 72 is formed with a handle or head 74 exposed at one side of the machine for convenient manipulation by the operator when it is desired to effect the reversal of the ribbon feed by hand. To positively retain the clutch levers 51, the reversing bar 65 and shifter 68 in the positions to which they are moved either by the automatic operation of the controlling devices or by the manual operation of the reversing rod, a retaining device is provided. This device comprises a retaining spring 75 screwed or otherwise secured to the shifter 68 and bent to form a catch 76 designed to engage either of two annular groves 77 formed in a collar 78 fixed to the shaft 7. To prevent reverse rotation of the shaft 7, the latter is provided with a fixed ratchet 79, the teeth of which are spaced to correspond with the spacing of the carriage and engaging a pawl 80 carried by a relatively fixed part, as shown in Fig. 7.

It will now be seen that as the carriage advances, the engagement of the rack 35 and pinion 36, the former being stationary and the latter movable with the carriage, will effect the rotation of the ribbon feed shaft 7, through the medium of the interposed gearing and thus drive the ribbon spool whose clutch lever 51 is in engaging position, the opposite or disengaged spool being rotated independently by the ribbon being withdrawn or unwound therefrom. Also, it will be seen that as such ribbon is unwound, it will permit the follower 59 of the adjacent controlling device 58 to approach the axis of the spool until the reversing cam 57 of said device is presented in position to be engaged by the tail 56 of the disengaged clutch lever 51. During the next few advances of the carriage after this relation of the parts has been established will be accompanied by a continued feeding of the ribbon and by the shifting of the disengaged clutch lever into engagement, the simultaneous disengagement of the other clutch lever 51 being, of course, effected by the reversing bar 65. When the carriage is retracted, the ribbon feeding shaft 7 will not rotate because in the line of gearing between the feed pinion 36 and said shaft is interposed the pawl and ratchet 44 and 45. Therefore, while the pinion 36, shaft 37 and gears 40 and 41 will be rotated backward during the retraction of the carriage, the pawl 44 will move idly back over the ratchet 45 to avoid reverse rotation of any of the parts beyond the pawl. Any tendency of such parts to rotate will be effectually resisted by the pawl 80.

It is also desirable to throw the ribbon feeding mechanism out of action and to thus discontinue the feed of the ribbon whenever the carriage is released from the carriage feeding mechanism, as, for instance, in jumping or skipping the carriage from one point to another as in tabulating. This end is obtained by providing ribbon release mechanism which, in the present embodiment of my invention, is operated by the carriage release mechanism.

Figure 6:
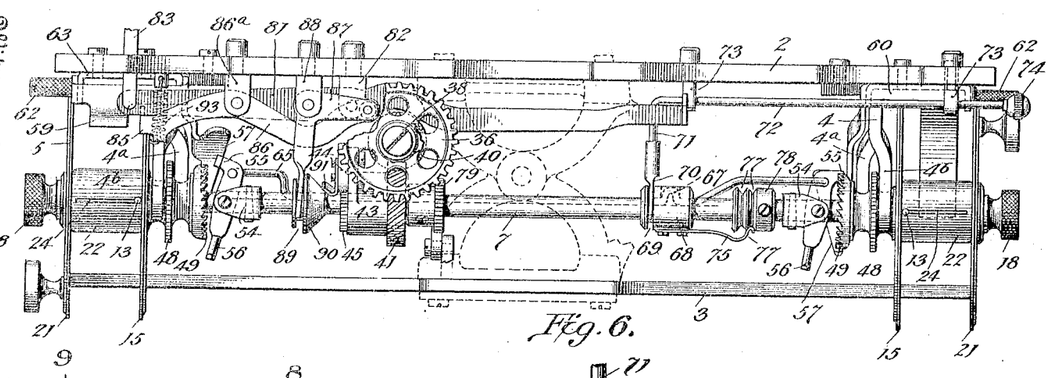
Fig. 6 is a rear elevation of a portion of the ribbon mechanism.

81 indicates the carriage release lever (see Fig. 6) fulcrumed in a bracket 82 suspended from the deck 2 adjacent to its rear edge and having at one end a connection 83 extending to the carriage release key, not shown. The other end 84 of the carriage release lever (see Fig. 10) is bent rearwardly to engage and operate the holding dog of the carriage escapement in a manner fully explained in another application for Letters Patent. Adjacent to the connection 83, the carriage release lever 81 overlies the laterally deflected end 85 of the ribbon release lever 86 fulcrumed in a bracket 86ª dropped from the deck 2. The opposite end of the lever 86 is connected to one arm of a bell crank cam shifter 87 fulcrumed in a bracket 88 and having its other arm bifurcated to engage an annular groove 89 formed in a cam 90 of truncated cone shape, mounted to slide longitudinally on the shaft 7 and designed to engage an inclined finger 91 extending from a plate 92 secured to one side face of the pawl 44 and extended inwardly, or toward the axis of the shaft 7 to dispose the finger in position to be engaged by the cam 90. Normally, however, the pawl 44 is in engagement with the ratchet 45 and the cam 90 is retained in its inactive position by a spring 93 secured to one end of the lever 86 and to the deck and tending to retract the ribbon release mechanism as well as the carriage release lever engaged thereby.

It will now be seen that whenever the carriage is released from the escapement by the operation of the carriage release lever 81, the ribbon release lever 86 will be swung to operate the cam shifter 89 which will force the cam 90 under the finger 91 and thus lift the pawl 44 out of engagement with the ratchet 45. As long as the cam 90 is retained in this position, the pinions 36, 40 and 41 will rotate idly with the pawl 44 ineffective and the finger 91 traveling upon the face of the cam 90. The ribbon feed shaft 7, of course, remains stationary and any feeding movement of the ribbon is discontinued until the operator relieves the pressure on the carriage release mechanism and permits the retraction thereof and of the ribbon release mechanism at which time the withdrawal of the cam 90 from the finger 91 will permit the pawl 44 to reëngage the ratchet 45 and restore the ribbon feeding mechanism to operative condition.

We have now seen how the ribbon is supported by the two ribbon spools located at opposite sides of the machine adjacent to its rear, how it is guided to and across the machine and how its feed is effected and controlled. It is now in order to ascertain how the ribbon is depressed into comparatively close relation to the work sheet at the printing point and how that portion of the ribbon, located at and adjacent to the printing point, is vibrated automatically to present the ribbon at the printing point during the moment of printing and to withdraw it from the printing point immediately after the moment of printing to make the writing visible.

To the under side of the front bar 3ª of the type ring 3 is screwed or otherwise secured, immediately opposite the printing point, a guide bracket 94 substantially U-shape in cross section and serving as a combined vibrator and line finder guide. From the vertical side of the bracket 94 a pair of parallel arms 95 extend rearwardly, connected at their rear ends by the camming and guiding bar 96 of a line finder, to be described, and supporting a pair of rearwardly extended and laterally deflected supporting guiding fingers 97 having vertically disposed front ends 98 having oppositely opening kerfs 99 in their outer edges. These kerfs or notches 99 are designed for the reception of the guide flanges 100 of the ribbon vibrator 101 and occupying a horizontal plane somewhat elevated, relative to the depressed body portion of the vibrator. The guide flanges 100 are formed by bending into a horizontal plane the upper edges of a pair of inclined ribbon guides 102 formed at the opposite sides of the rear end of the vibrator and disposed at opposite angles at substantially forty-five degrees. Disposed opposite the outer or under side of each of these ribbon guides 102 are a pair of oppositely disposed ribbon fingers 103 under which the ribbon is led and which not only retain the ribbon snugly against the vibrator and depressor but also compel the ribbon to move laterally with the vibrator as the latter is operated in the manner to be described. The body portion of the ribbon vibrator is of substantial U-shape to afford an opening between the ribbon guides for the accommodation of the type bars and has a forwardly extended, somewhat elevated slide 104, the side edges of which are slidably received within kerfs 105 and the down-turned extremities of the front supporting and guiding fingers 106 extended forwardly from the bottom of the bracket 94. The slide 104 is provided with suitable stops 107 and 108 which engage the supporting structure and limit the sliding movement of the vibrator.

It may be noted in passing, that the bracket 94 together with its arms and guide fingers, is stamped from a single piece of metal and that similarly the vibrator, the slide, guide fingers and ribbon guides are formed in the single integral structure.

Figures 2, 3:
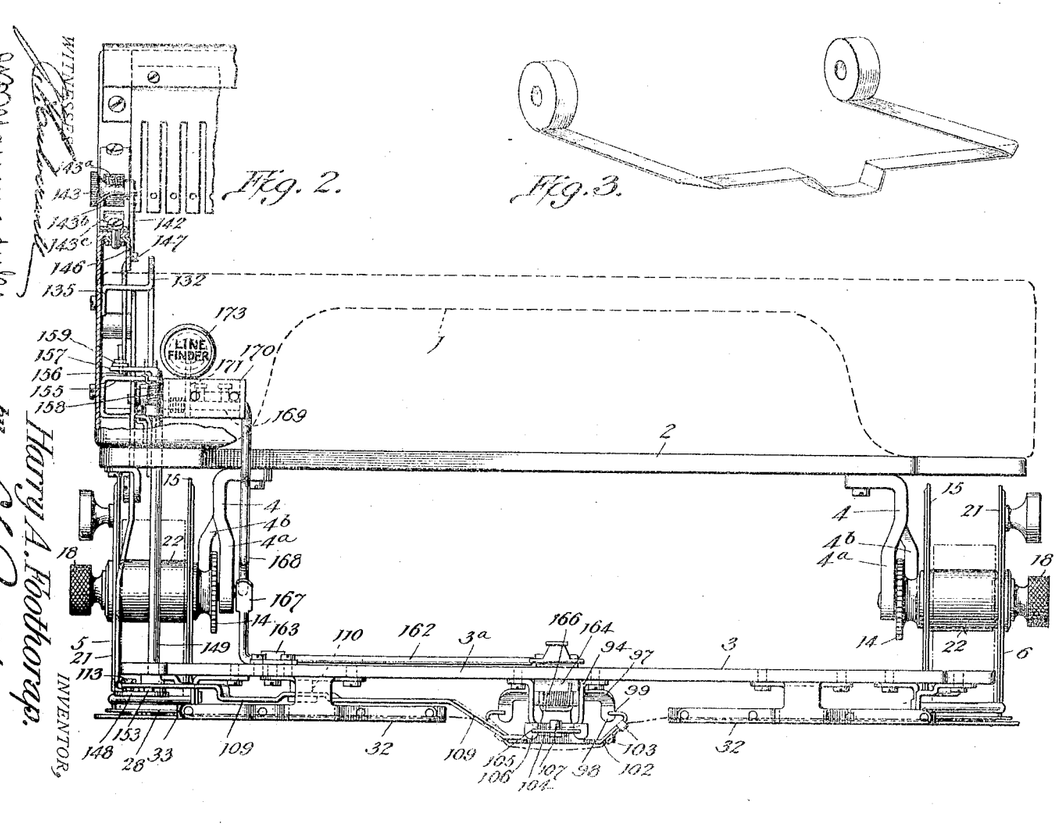
Fig. 2 is a front elevation of so much of an Elliott-Fisher billing machine as is necessary to show the application of the ribbon mechanism.
Fig. 3 is a diagrammatic view of the ribbon.

It may also be noted in passing, reference being had more particularly to Fig. 2, that the front ribbon guides 32 are located in approximately the same horizontal plane as the upper portions of the ribbon vibrator. This results in separating the platen and the ribbon by a considerable interval except for that small section of the ribbon which passes under and is depressed close to the work element at the printing point by the combined ribbon depressor and vibrator. This relation of the ribbon guides reduces to a minimum the possibility of interference between the ribbon or its guides and the work sheets imposed upon the platen.

Normally the ribbon vibrator 101 occupies an advanced position, as shown in Fig. 1, the line of writing being entirely exposed to the view of the operator. The depression of a key, however, to print is designed to shift the vibrator rearwardly to carry the ribbon opposite the printing point. This is accomplished by the following instrumentalities:

A vibrator lever 109 is fulcrumed below the bar 3ª at 110 and has a bifurcated end 111 engaging a pin 112 projecting from the vibrator. The lever 109 is properly formed to afford clearance of the adjacent parts and at its outer end, which is located at the front left hand corner of the machine (see Fig. 1), is connected by a connecting rod 113 with the lower end of what may be termed a variable lever 114 through which motion is transmitted to the vibrator lever and which has a variable throw to vary the extent of movement of the vibrator and thus determine the particular stripe or track of the ribbon which will be presented at the printing point when the vibrator moves back. The lever 114 is fulcrumed on a bracket 115 dropped from the deck 2 and is formed with a short arm 116 to which a retracting spring 117 is attached. The upper end of the lever 114 extends upwardly into the carriage casing adjacent to the left hand end thereof through an opening 118 of the deck and is provided with a longitudinal slot 119 of slightly arcuate form having a lateral enlargement 120 at its lower end. The slot 119 in the lever 114 is designed to receive a stud 121 carried at the front end of a rod 122 connected at its rear end to an arm 123 extended downwardly from the universal rocker 124 having forwardly extending arms 125 from which are suspended the hangers 126 of the universal bar 127 which underlies an abutment screw 128 on the key levers 129. A retracting spring 130 tends to retract the rocker 124 and to release the key. It will now be seen that when a key is depressed, the consequent depression of the universal bar 127 will rock the rocker 124, swing back the arm 123 and through the connecting rod 122 swing the lever 114 and thus through the connecting rod 113 and vibrator lever 109 shift the vibrator back to present the ribbon at the printing point, the retraction of the operative parts occurring, of course, upon the release of the key and withdrawing the ribbon to reveal the written matter.

It is desirable to provide, not only for the oscillation of the ribbon but also for the control of such oscillation for the purpose of causing any particular stripe or track of the ribbon to be presented at the printing point in order to show the use of the entire ribbon or for printing in different colors and to also render the ribbon oscillating mechanism inactive so that the ribbon will not be presented at the printing point when the printing mechanism is operated as, for instance, in the use of the machine for stencil.

In the present embodiment of my invention the specified character of control is obtained by providing in the train of motion transmitting elements between the key and the vibrator, a variable connection which may be set without moving the vibrator or the key to establish a predetermined condition which, upon the operation of the key, will result in a corresponding predetermined movement of the vibrator or render the same entirely inoperative. This controlling or setting means for the ribbon vibrating mechanism may be termed a selective device. I will now proceed to describe its construction and arrangement.

It has been stated that the pin or stud 121 at the front end of the connecting rod 122 engages a longitudinal slot 119 formed in the lever 114 and having a lateral enlargement at its lower end. It will now be seen that if this stud or pin connection is shifted toward or from the fulcrum of the lever 114, the leverage will be varied. Consequently, since the longitudinal movement of the connecting rod 122 is uniform under all conditions, the change of leverage will change in corresponding degree the throw of the lever 114 and consequently the throw of the vibrator. Thus in Fig. 4 the connection is in an intermediate position which, upon the operation of the key, will result in the maximum throw or vibration of the ribbon to present the rearmost stripe or track thereof which, in the present instance, is red, largely used for the printing of credits and totals. By shifting the connection further from the fulcrum, the leverage will be increased thus reducing the throw of the vibrator to present the rearmost track or stripe of the ribbon at the printing point. If, on the contrary, the connection is shifted from the position shown in Fig. 4 toward the fulcrum of the lever 114, the pin 121 will be presented to the lateral enlargement 120 of the slot 119 and will move idly back and forth therein without operating the lever 114 so that the ribbon will not be thrown back when the printing mechanism is operated for the cutting of stencils.

Figures 14, 15, 16, 17, 18, 19:
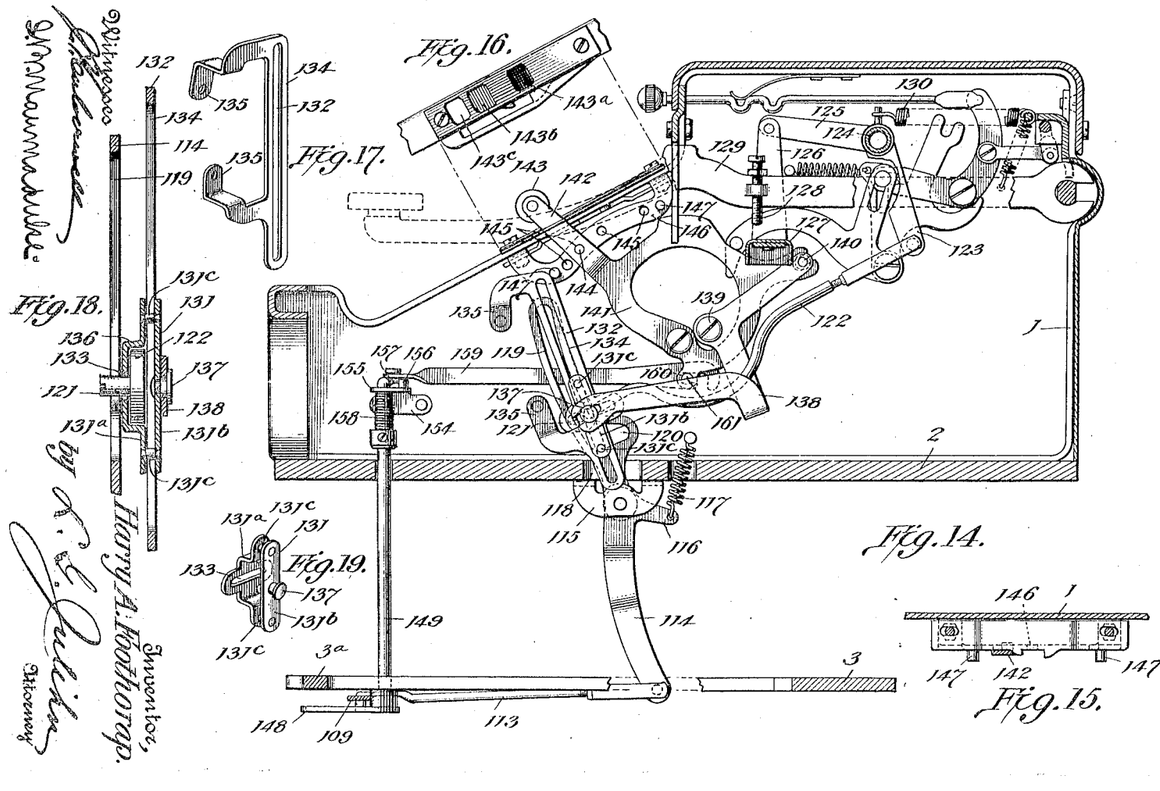
Fig. 14 is a transverse sectional view through the carriage casing and showing in side elevation a portion of the ribbon vibrating mechanism and the ribbon selecting mechanism and indicator.
Figs. 15 and 16 are detail views of the indicator.
Fig. 17 is a detail view of the guide for the shifting connection.
Fig. 18 is a detail sectional view of the shifting connection of the ribbon vibrating mechanism.
Fig. 19 is a detail perspective view of one of the elements of said connection.
Figure 20:
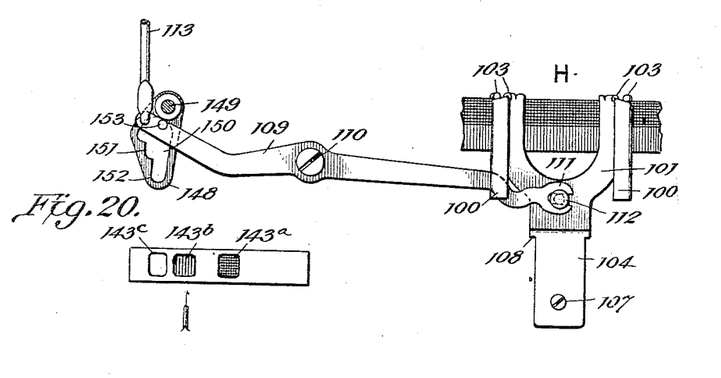
Figs. 20, 21 and 22 are plan views in different positions of the variable ribbon stop.

To secure the described variation of the connection 121, a shifter 131 is movably mounted on a shifter guide 132 and is provided with a transverse guide slot 133 through which the pin 121 extends. The shifter 131 comprises a pair of plates 131ᵃ and 131ᵇ connected in parallel spaced relation by pins 131ᶜ which pins extend through and move within the longitudinal slot 134 in the guide 132. This guide 132 is in the form of a metal plate secured to but spaced from the left hand end wall of the carriage casing by tabs 135. The plate 131ᵃ of the shifter 131 is deflected to form a guide 136 to receive the end of the connecting rod 122, it being noted by reference to Fig. 18 that the end of the rod is housed in the shifter with the pin 121 projecting through the slot 133 in the shifter and into engagement with the lever 114. The slot 133 being disposed longitudinally of the rod 122, permits the pin to move back and forth to operate the lever 114 but compels said pin to remain at a predetermined distance from the fulcrum of the lever 114, as determined by the position of the shifter. To effect the movement of the shifter 131 longitudinally of the guide 132 to vary the leverage in the manner and for the purpose stated, I provide a headed stud 137 projecting from the shifter and engaged by the bifurcated front end of the shifter operating lever 138 fulcrumed at 139 on the side wall of the carriage casing and bent into a form necessary to avoid its interference with the rod 122. At its rear end the lever 138 has a pivotal connection 140 with one arm of the ribbon shift lever 141, having another arm 142 extended outside of the carriage casing and terminating in a handle or key 143. By manipulating what may be termed the ribbon shift key 143, the lever 141 may be moved to swing the lever 138 and thus move the shifter 131 and a variable connection 121 toward or from the fulcrum of the lever 114.

In addition to its function as a setting or selecting device for the ribbon vibrating mechanism, the key 143 also serves as an indicator since its position indicates to the operator which stripe or track of the ribbon will be moved to the printing point. To make the significance of its position appear at a glance, the key moves opposite different indications 143ᵃ, 143ᵇ and 143ᶜ corresponding to the portions of the ribbon. These indications in the present arrangement display black, red and blank, corresponding with the black and red stripes of the ribbon and with the blank or non-printing result attained when the key 143 is moved to the stencil position. Obviously the range of movement for the ribbon shift or selecting mechanism may be easily extended, as, for instance, for the use of a ribbon having more than one track of any color or all colors or a greater number of color stripes. In such cases, of course, the indications would be correspondingly variable.

It is desirable to provide means for retaining the shift key 143 in its various set positions and a simple form of such means is shown and contemplates slight flexibility of the arm 142 and the mounting thereon of a pin 144 designed to engage one of a series of openings 145 in a retaining plate 146 fixed to the carriage casing. In addition to the openings 145, the retaining plate is provided with stop lugs 147 which engage the arm 142 at its extreme limits of movement.

While the described mechanism would vibrate the ribbon accurately, it is desirable to make provision for the positive arrest of the ribbon when thrown back so as to insure against inaccuracies due to the possible development of lost motion in the line of connection between the key and the vibrator after long continued use of the machine. For this purpose a variable ribbon stop 148 is mounted at the lower end of a vertical rock shaft 149 having bearings between the deck 2 and the type ring 3 located adjacent to the left hand front corner of the carriage.

Figure 21:
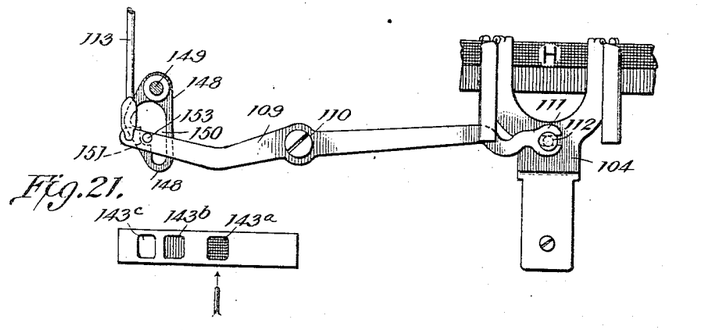
Figure 22:
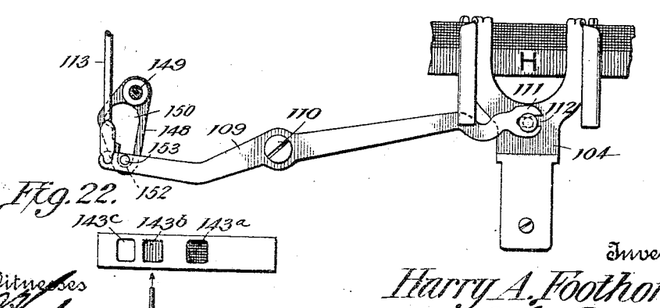
Figures 23, 24, 25, 26:
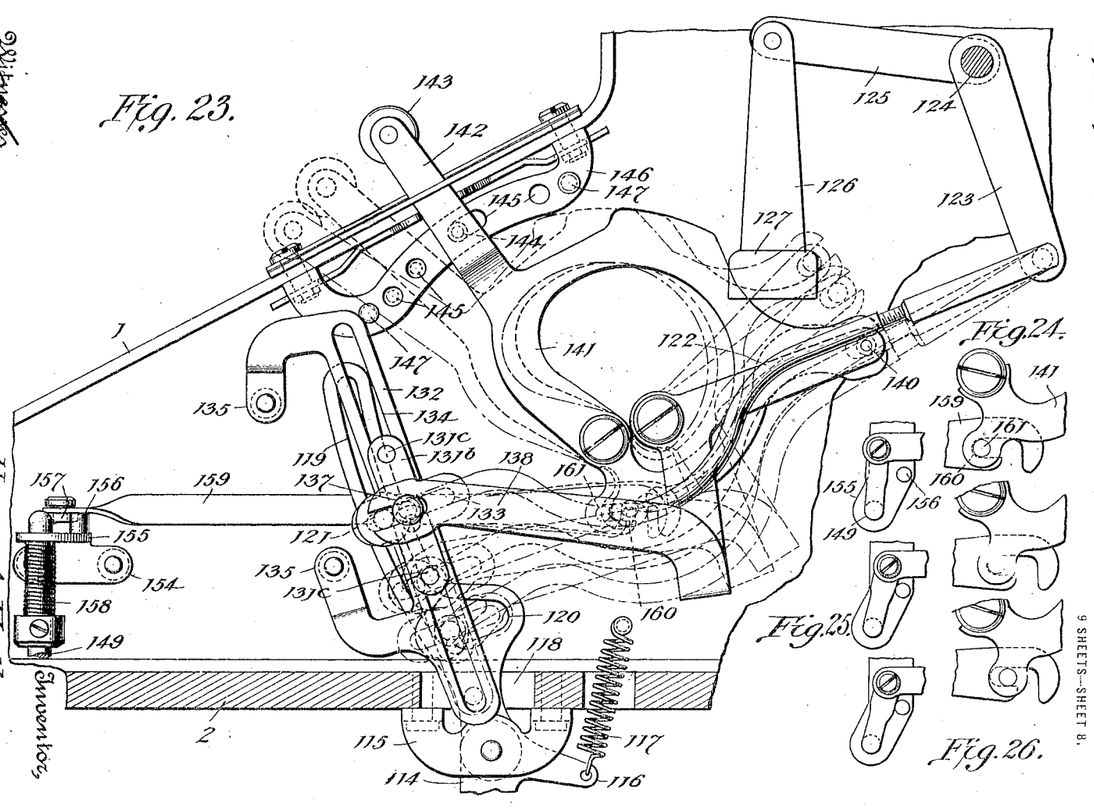
Fig. 23 is a view on a somewhat larger scale of the ribbon setting and vibrating mechanism, the parts being shown in dotted lines as moved to different positions of adjustment.
Figs. 24, 25 and 26 are detail views of the connection between the ribbon shift and stop mechanisms, the parts being illustrated as they appear at different periods of the operation.
Figures 27, 28, 29, 30, 31:
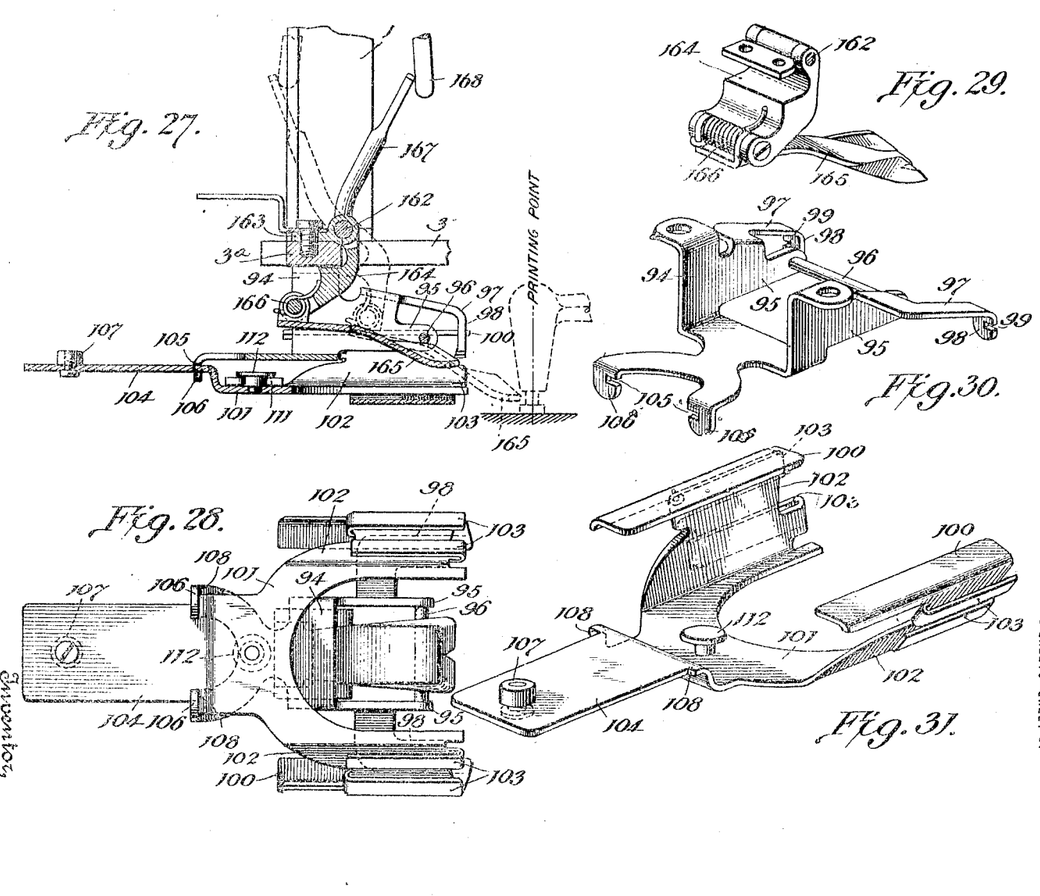
Fig. 27 is a vertical sectional view through the ribbon vibrator and line finger, the printing position of a type bar and the line finding position of the line finder being indicated by dotted lines.
Fig. 28 is a plan view of the subject matter of Fig. 27.
Fig. 29 is a detail view of the line finder.
Fig. 30 is a detail perspective view of the ribbon vibrator bracket.
Fig. 31 is a similar view of the vibrator.

The stop plate 148 is provided with a slot 150 widened intermediate of its ends to form a stop face 151 in addition to the stop face 152 formed by the outer end of the slot. Within the slot 150 of the slot plate 148 works a stop pin 153 projecting downwardly from the outer end of the ribbon vibrator lever 109. Normally, that is to say, when the ribbon shift key 143 is opposite the black indication 143ª, the ribbon stop will be in the position indicated in Fig. 21 and the stop pin 149 will play between the rear end of the slot 150 and the stop face 151 when the ribbon is vibrated upon the depression of the key. Thus all possibility of overthrow of the vibrator will be positively prevented. By rocking the shaft 149 in a manner to be described, the stop plate will be swung to the position indicated in Fig. 1, which will permit the stop pin 149 to have a somewhat longer movement until arrested by the stop face 152, which is the maximum throw of the parts and in the present instance presents the red stripe of the ribbon to the printing point. The movement of the stop plate 148 is controlled from the shift key 143. (See Fig. 14). Within the carriage casing is secured a bracket 154 having a horizontal portion 155 which affords a bearing for the upper end of the shaft 149 and is provided with a stop 156. The upper end of the shaft 149 is provided with an arm 157 which is normally urged against the stop 156 by a spring 158 encircling the shaft and having its opposite ends secured to the shaft and bracket respectively. Connected to the end of the arm 157 is a rearwardly extended link 159 provided at its rear end with a short stop 160 to receive a pin 161 extended from the ribbon shift lever 141 below the fulcrum thereof. When the shift key 143 is in its rearmost or black position, the arm 157 is held away from the stop 156 and the stop plate 148 is held in position to bring the stop face 151 into use. When the key 143 is moved to the red or rearward movement, the pin 138 permits the spring 158 to rock the shaft 149, shift the stop plate 148 to red position and bring the arm 157 against the stop 156. When the shift key 143 is moved forward from red to stencil, no movement of the stop plate 148 is contemplated. The pin 161 merely moves idly in the slot 160 while the lever 141 moves to shift the pin 141 opposite the lateral enlargement 120 of the slot 119 in the lever 114 to permit, as heretofore described, the operation of the printing mechanism without vibrating the ribbon. When the shift key 143 moves back from stencil to red, the pin 161 moves to the front end of the slot 160 in the link 159 and the ribbon vibrating mechanism is restored to operative condition. Then when the shift key is moved back to black, the vibrating operations are varied to reduce the throw of the vibrator, as described, and the arm 157 is swung to rock the shaft 149 and shift the ribbon stop plate 148 to normal position against the resistance offered by the spring 158.

Mounted on the front bar 3ª of the type ring 3 is a line finger shaft 162 accommodated by bearing brackets 163 secured to the bar. At its inner end, the shaft 162 is provided with an arm 164 pivotally connected to the rear end of the line finder 165 which constantly tends to move upward under the impulse of a spring 166 located in the connection between the arm and finder. This spring holds the finder against the under side of the bar 96 and in a sufficiently elevated position to prevent interference with the ribbon. The body portion of the line finder, however, is cam-shape or longitudinally curved so that when the lower end of the arm 164 is swung rearwardly the line finder is urged rearwardly and at the same time its rear end is elevated. The result of these pecularities of form and movement is to cause the rear end of the line finder to move back and downward to the printing point, the usual notch in its rear edge serving to locate the exact point of printing. At its outer end the line finder shaft 162 is provided with an arm 167 which is disposed vertically and has its upper end in operative relation to the lower end of an arm 168 of a rock shaft 169 mounted in the carriage casing adjacent to its front left hand corner, as, for instance, in a bracket 170 and having a short arm 171 connected to the inner end of the stem 172 of the line finder key 173, said stem extending through the front of the carriage casing, as shown.

Having described my invention, what I claim is:—

1. The combination with the movable carriage and printing mechanism of a typewriter, of a pair of ribbon spools mounted at the opposite ends of the carriage adjacent to the rear side thereof, a ribbon vibrator mounted opposite the printing point at the front side of the carriage, and angular guides located at the front corners of the carriage to guide the ribbon to the vibrator from the spools.

2. The combination with the movable carriage and printing mechanism of a typewriter, a pair of ribbon spools mounted at the ends of the carriage and having their axes disposed endwise thereof, a vibrator located at the front of the carriage and movable in a path at right-angles to the axes of the spools and means for guiding the ribbon to the vibrator from the spools.

3. The combination with the movable carriage and printing mechanism of a typewriter, of ribbon spools mounted at opposite ends of the carriage, end guides extended from the spools to the front of the carriage front guides extended along the front side of the carriage from the end guides and a ribbon vibrator located between the front guides.

4. The combination with a typewriter carriage having a deck and a type ring suspended below the deck, of ribbon spools suspended from the deck, ribbon guides suspended from the type ring and a ribbon vibrator located in a plane below the type ring.

5. The combination with the movable carriage and printing mechanism of a typewriter, said carriage including a deck and a type ring below the deck, of ribbon spools suspended from the deck, ribbon guides suspended from the type ring and a ribbon vibrator operated by the printing mechanism.

6. The combination with the carriage and printing mechanism of a typewriter, of ribbon spools mounted at opposite ends of the carriage with their axes disposed lengthwise thereof to facilitate convenient withdrawal of said spools, angular ribbon guides located at the front corners of the carriage to direct an intermediate portion of the ribbon across the front of the carriage and a ribbon vibrator engaging the ribbon adjacent the printing point and operated by the printing mechanism.

7. The combination with the carriage and printing mechanism of a typewriter, of a pair of ribbon spools, ribbon supporting and guiding means disposed horizontally to support and guide the ribbon between the spools and a combined ribbon depressor and vibrator located at the middle of the front side of the carriage and depressing a comparatively small portion of the ribbon close to the platen at the printing point and operated by the printing mechanism to shift the ribbon laterally to and away from the printing point.

8. In a typewriter, the combination with a vibrator and a key, of a lever operatively connected to the vibrator and having a longitudinal slot, a connecting rod operatively connected to the key and having a pin engaging the slot in the lever, a shifter guide and a shifter mounted on the guide and engaging said pin to shift the same to different positions relative to the lever.

9. In a typewriter, the combination with a ribbon vibrator and keys, of intermediate motion transmitting elements including a lever having a longitudinal slot therein and a connecting rod having a pin extended into the slot of the lever, a fixed shifter guide, a shifter movable on said guide and engaging said pin to move the same to different positions relative to the fulcrum of the slotted lever, and a key for moving the shifter.

10. In a typewriter, the combination with a ribbon vibrator and a key, of intermediate motion transmitting elements including a slotted lever and a connecting rod having a pin engaging said lever, a shifter guide disposed longitudinally of the lever, a shifter movable on said guide and having a transverse slot engaging the pin and permitting the operating movement thereof when the vibrator is moved, and means for moving the shifter to different positions on the guide to move the connecting pin toward or from the fulcrum of the lever.

11. In a typewriter, the combination with a ribbon vibrator and a key, of a lever connected to the vibrator and having a longitudinal slot, a connecting rod movable longitudinally by the key and having a pin engaging the slot in the lever to swing the lever when the rod is moved longitudinally, a shifter having a slot disposed transversely of the lever to accommodate the operative movement of the pin, a fixed guide along which the shifter is movable longitudinally of the slot in the lever, a key movable to different set positions, and a connection whereby the movement of the key will effect a corresponding movement of the shifter on its guide.

12. In a typewriter, the combination with a key and a ribbon vibrator, of intermediate motion transmitting elements including a lever having an angular slot and also including a connecting rod having a pin engaging the slot and means for shifting the pin to different portions of the slot in the lever to render the connection effective or ineffective.

13. In a typewriting machine, the combination with a key and a ribbon vibrator, of intermediate operating connections including a lever having a longitudinal slot with a lateral offset and also including a connecting rod having a pin engaging said slot and means for moving the pin to different effective positions lengthwise of the slot and to a position opposite the offset to render the connection ineffective.

14. In a typewriter, the combination with a horizontally movable ribbon vibrator located at the lower side of the typewriter, a horizontally disposed lever for moving the vibrator, and a vertically disposed lever operatively connected to the horizontally disposed lever and located at one end of the typewriter, of a universal bar operatively connected to the vertically disposed lever and keys for operating the bar and located above the vibrator.

15. In a typewriter, the combination with a ribbon vibrator, coacting stop members therefor, one of which is movable to different positions, of a spring normally urging said movable stop member toward a predetermined normal position, and means for moving the stop member to other positions in opposition to the spring.

16. In a typewriter, the combination with a ribbon vibrator, keys and motion transmitting elements between the vibrator and the keys, said elements including a lever, connecting rod and a shiftable connection between the lever and rod, of a ribbon shift lever arranged to shift said connection to vary the throw of the lever first named, stop mechanism for the vibrator including coacting stops, one of which is movable to different set positions, and a connection between said last named stop and the ribbon shift lever whereby, when the ribbon shift lever is operated, the operating connections between the keys and the vibrator will be set to secure the desired throw of the vibrator and the stop mechanism will be set to correspond to the movement thus determined.

17. In a typewriter, the combination with a horizontally movable ribbon vibrator and operating means therefor including keys above the vibrator, of setting mechanism located intermediate of the keys and vibrator and controlling the throw of the latter, a stop mechanism for the vibrator including two coacting stops, a vertically disposed rock shaft for moving one of the stops to different set positions, and a connection between the setting means and said rock shaft.

18. In a typewriter, the combination with a horizontally movable vibrator, keys located above the vibrator, a vertically disposed lever operatively connected to the keys and a shiftable connection between the connecting rod and the vertically disposed lever, of a ribbon shift key for shifting said connection and a variable stop mechanism arranged to be set by the key.

19. In a typewriter, the combination with a carriage casing, of a ribbon vibrator located below the casing, keys located above the casing, stop mechanism located below the casing to limit the movement of the vibrator, said stop mechanism being movable to different set positions, variable operating connections between the keys and the vibrator, said connections being also variable to different set positions, means mounted in the casing and operative to set both stop mechanism and the operating connections of the vibrator.

20. In a typewriter, the combination with a carriage having a deck, of brackets suspended from the deck, ribbon spools, a ribbon feeding shaft and intermediate gearing all supported by the brackets, a fixed rack and gearing between the fixed rack and shaft.

21. The combination in a typewriter, of a horizontally movable ribbon vibrator, a series of operating keys located above the vibrator, variable operating connections between the keys and the vibrator, means for varying said connections including a ribbon shift lever located at one end of the typewriter, a variable stop device for the vibrator, and connections between said variable stop device and the ribbon shift lever.

22. In a typewriter, the combination with a ribbon vibrator movable horizontally, of a horizontal lever extended from the vibrator to one end of the typewriter, a series of keys located above the vibrator, variable operating connections between said keys and said horizontal lever, a variable stop device coacting with said horizontal lever, means including a ribbon shift lever for varying the operating connections to vary the throw of the vibrator, and a connection between the variable stop device and the ribbon shift lever to vary said device.

23. The combination with the relatively movable carriage and platen of a typewriter, of ribbon spools mounted on the carriage, a ribbon vibrator also mounted on the carriage and movable relative thereto toward and from the printing point and guides arranged to guide the ribbon to the vibrator from the spools and located a greater distance than the vibrator from the platen.

In testimony whereof I affix my signature in presence of two witnesses.

HARRY ARTHUR FOOTHORAP.

Witnesses:
W. J. EVERT,
EDWIN FLOYD.